United States Patent Office 3,514,887
Patented June 2, 1970

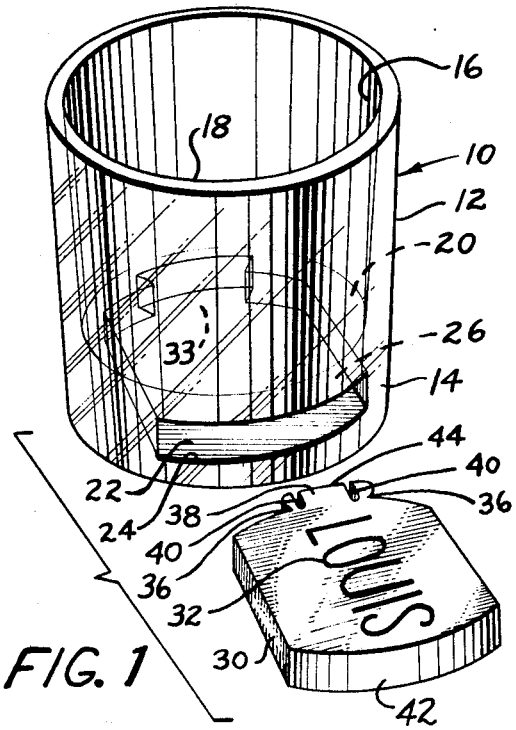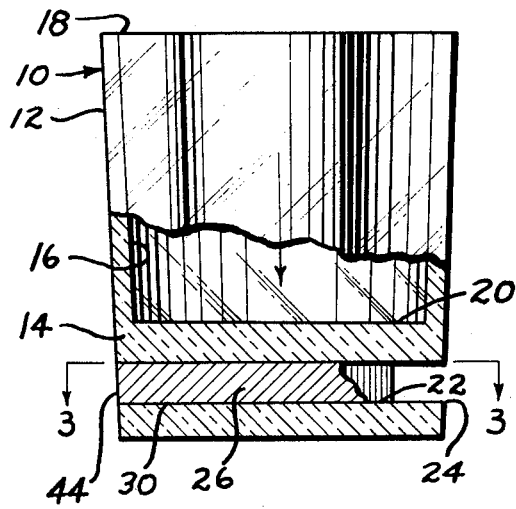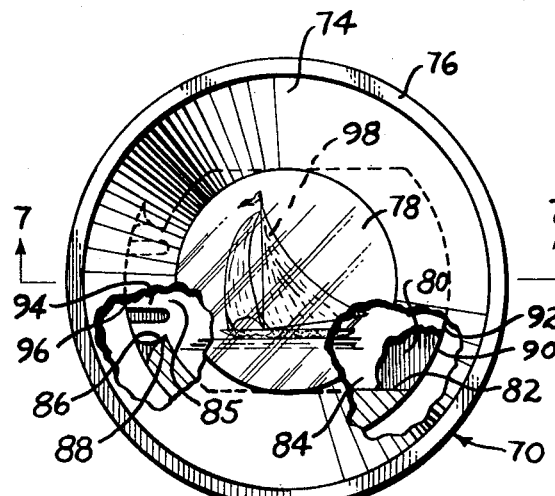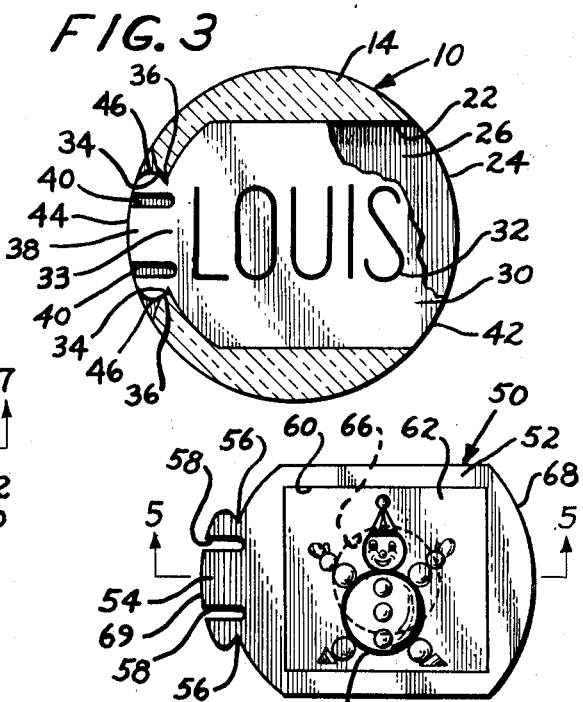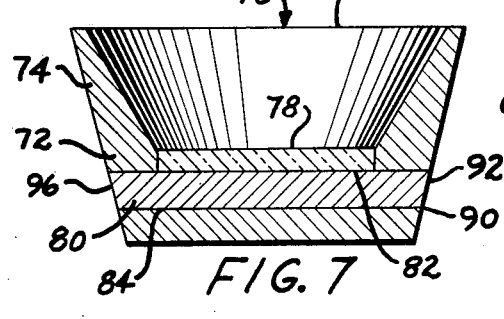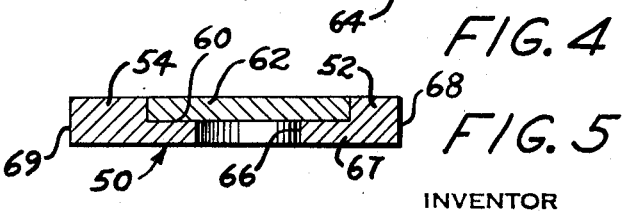
INVENTOR
BEATRICE A. JACOB
BY
Samuelson & Jacob
ATTORNEY

3,514,887
FEEDING UTENSILS FOR CHILDREN
Beatrice A. Jacob, 269 Parker Ave.,
Hackensack, N.J. 07601
Filed Jan. 16, 1968, Ser. No. 698,333
Int. Cl. G09f 3/00
U.S. Cl. 40—324                 6 Claims

ABSTRACT OF THE DISCLOSURE

A child's feeding utensil including a vessel with a transparent bottom, a cavity below the bottom and a visual display such as a picture or a text removably retained within the cavity so that the retained display may be viewed through the transparent bottom and may be selectively removed and replaced when desired.

---

The present invention relates generally to feeding utensils for children and pertains, more specifically, to feeding utensils such as cups, drinking glasses, dishes, and like utensils which include a vessel, the utensils being constructed in such a manner as to encourage a child to consume all of the food placed in the utensil.

Through the ages, parents have been faced with the common problem of encouraging their children to complete the meals placed before them by consuming all of the food in the utensils set before them. In an effort to combat the problem, utensils such as drinking glasses, cups and dishes have been decorated with a wide variety of pictorial illustrations and textual materials which, hopefully, will capture the interest of the child and encourage the child to eat the food in the utensil. Some of these illustrations and materials have been placed on the bottom of utensils so that they ordinarily become covered with the food in the utensil thereby encouraging the child to consume the food and reveal the illustration or text. It has been found, however, that a child faced with the same pictures and same text day after day may soon tend to lose interest in uncovering the pictorial and textual material and the purpose of such material becomes defeated.

It is therefore an important object of the invention to provide a child's feeding utensil wherein visual or textual material appearing at the bottom of the utensil may be changed from time to time in order to increase the interest of the child in uncovering such material.

Another object of the invention is to provide a child's feeding utensil wherein pictorial or textual material is visable through the bottom of the utensil and may be easily changed when desired.

A further object of the invention is to provide a child's feeding utensil including interchangeable visual matter in the bottom thereof and having a construction which is economically fabricated, easy to use and readily cleaned.

The above objects, as well as still further objects and advantages, are attained in the invention which may be described briefly as a child's feeding utensil including a vessel having a longitudinally extending interior with a transverse, transparent bottom, a transverse cavity below the bottom, and means for selectively retaining a visual display within the cavity such that the retained display may be viewed along a longitudinal direction through the interior and the bottom and for selectively removing the visual display from the cavity such that the viewed display may be changed when desired.

The invention will be more fully understood and still further objects and advantages will become apparent in the following detailed description of preferred embodiments of the invention illustrated in the accompanying drawing, in which:

FIG. 1 is a diagrammatic perspective view of a child's drinking glass constructed in accordance with the invention;

FIG. 2 is a partially cross-sectioned elevational view of the drinking glass of FIG. 1;

FIG. 3 is an enlarged cross-sectional view taken along line 3—3 of FIG. 2;

FIG. 4 is a plan view of a tray which forms a component part of an embodiment of the invention;

FIG. 5 is a cross-sectional view taken along line 5—5 of FIG. 4;

FIG. 6 is a plan view of a child's feeding dish constructed in accordance with the invention; and FIG. 7 is a cross-sectional view taken along line 7—7 of FIG. 6.

Referring now to the drawing, a child's feeding utensil is shown in the form of a drinking glass 10 in FIGS. 1 through 3. Drinking glass 10 has an almost cylindrical configuration which is conventional for such vessels and which includes an annular wall 12 rising from a base 14 to define an interior 16 extending axially from an open mouth 18 to a bottom 20.

Extending transversely through the base 14 and below the bottom 20 is a slot 22 having an opening 24 at one end thereof and establishing a cavity 26 in the base. A visual display illustrated in the form of a card 30 including printed matter 32 thereon has an outline configuration complementary to the cavity 26 and may be slipped into the slot 22 and seated therein as shown in FIGS. 2 and 3. The drinking glass 10 is preferably constructed of a transparent material, such as glass or any one of a variety of suitable transparent synthetic resins, so that the bottom 20 is transparent and the printed matter 32 on the visual display card 30 may be viewed along a longitudinal direction, as indicated by the arrow in FIG. 2, through the interior 16 and through the bottom 20.

As best seen in FIGS. 1 and 3, the slot 22 is provided with a constriction 33 establishing detents 34 adjacent the other end thereof and these detents 34 cooperatively engage corresponding detents 36 located at either side of a tab 38 which projects from the visual display card 30, when the visual display card is properly seated within the cavity 26 in order to retain the visual display card within the cavity. A short slot 40 is juxtaposed with each detent 36 in order to enhance the ability of the detents 36 to resiliently flex toward the tab 38 during insertion and removal of the card 30 and attain effective engagement and disengagement of the cooperating detents 34 and 36.

The end 42 of the visual display card 30 is provided with a radius equal to the radius of the outer perimeter of the drinking glass at the elevation of slot 22 so that when the card is properly seated within the cavity 26 the end 42 will be flush with the outside of the drinking glass. Likewise the tab 38 has a matching radius at end 44 and projects from the card 30 only far enough to remain flush with the outside surface of the drinking glass. Smaller radii are provided at 46 on each detent 36 to facilitate the passage of the detents 36 through the constricted area of the slot 22 in the vicinity of the detents 34 as the visual display card 30 is being seated within the slot. Thus, once the visual display card is seated within the cavity no portions of the card will project beyond the outer perimeter of the drinking glass so that a child using the drinking glass cannot grip any portion of the visual display card and remove the card from the cavity.

However, when it is desired to remove the visual display card 30 so that the card may be interchanged with any one of a number of cards displaying a variety of visual material, the tab 38 may be pressed to urge the tab back toward opening 24 and push the card 30 to the right as seen in FIGS. 2 and 3, thereby releasing the grip of the detents and allowing the visual display card to be removed. In this manner a particular visual display card may be placed within the drinking glass, and the drinking glass may be filled with liquid such as, for example, milk. The child, being unaware of which visual display is present in the base of the glass will then be encouraged to consume the contents of the glass and uncover the transparent bottom through which the visual display card may be viewed. Hence, an incentive is provided for the child to drink his milk. It will be apparent that the entire procedure may be made into a guessing game and affords ample opportunity for surprises, all of which will encourage a child to consume the contents of the drinking glass.

Turning now to FIGS. 4 and 5, there is illustrated a tray 50 having a configuration similar to the configuration of the visual display card 30 so that the tray, rather than the card, may be slipped into the slot 22 when desired. Tray 50 is provided with a frame portion 52, a tab portion 54, and detents 56, each of which will cooperate with a corresponding detent 34 in the slot 22 in very much the same manner as the corresponding detents 36 of the visual display card 30, by virtue of slots 58 juxtaposed with detents 56. The frame portion 52 includes a recess 60 into which may be loosely placed a rectangular card 62 which, in this instance, contains a pictorial illustration 64. An aperture 66 in the bottom 67 of the frame portion 52 communicates with the recess 60 and enables the card 62 to be selectively pushed from the recess when desired so that the card 62 may be interchanged with any one of a variety of cards carrying either pictorial illustrations or printed material. In this manner it becomes possible to provide an infinite variety of visual displays in the drinking glass. Such a variety may include photographs of the child or his family, sketches or photographs of the child's favorite objects, or even flash cards containing educational material. The tray 50 is provided with a radius at one end 68 and the tab portion 54 is provided with a radius at end 69 so that when the tray 50 is placed within the slot 22, the tray will be flush with the external perimeter of the drinking glass 10.

Referring now to FIGS. 6 and 7, an alternate child's feeding utensil is shown in the form of a feeding dish 70 having a generally frusto-conical configuration including a base 72 and an upwardly and an outwardly flaring side wall 74. In this instance, the body 76 of the feeding dish is constructed of an opaque material while the bottom is in the form of an integral transparent insert 78 below which is a cavity 80 established by a transverse slot 82 passing through the base 72 in much the same manner as in the drinking glass 10. A visual display card 84 is received within the slot 82 in much the same manner as described above, the slot 82 being provided with a constricted portion 85 establishing detent portions 86 for cooperatively engaging corresponding detent portions 88 in the visual display card 84. The visual display card 84 is received through an opening 90 in the slot 82 and has a radius at one end 92 thereof and a second radius on a tab 94 at the other end 96 thereof, each of these radii matching the corresponding radius of curvature of the outer perimeter of the feeding dish 70 in the vicinity of the slot 82 so that once the card 84 is placed within the slot the ends thereof are flush with the outer perimeter of the feeding dish.

It will be seen that when food is placed in the feeding dish the illustration 98 on the visual display card 84 will be covered, thereby encouraging the child to consume the food and uncover the illustration. The card 84 may be changed at will by merely pushing upon the tab 94 to release the card from the slot 82.

It is to be understood that the above described embodiments of the invention are provided by way of example only. Various details of design and construction may be modified without departing from the true spirit and scope of the invention which is set forth in the appended claims.

The embodiments of the invention in which an exclusive property or privilege is claimed are defined as follows:

1. A child's feeding utensil comprising:
   a vessel having a longitudinally extending interior and a transverse transparent bottom, said vessel including a base below said bottom; and
   means for selectively retaining a visual display within said base such that the retained display may be viewed along a longitudinal direction through said interior and said bottom and for selectively removing said visual display from the base such that the viewed display may be changed when desired, said means including a slot extending into said base parallel to said bottom and below said bottom, said slot being spaced from the lowermost portion of the base and extending transversely across the entire base such that the slot is fully enclosed within the base with the exception of the ends thereof, an opening at one end of the slot for receiving said display and an opening at the other end of the slot for enabling removal of said display.

2. The child's feeding utensil of claim 1 including a tray slideably received within said slot, said tray having means for carrying the visual display.

3. The child's feeding utensil of claim 1 including at least one detent adjacent said other end of the slot for removably securing said visual display in the slot.

4. The child's feeding utensil of claim 3 wherein the slot includes a constriction adjacent the other end thereof, said constriction establishing said detent in the base of the vessel, said utensil including a visual display card having one end juxtaposed with the opening of the slot and an opposite end including a tab juxtaposed with the other end of the slot and a detent adjacent the tab for cooperatively engaging the detent in the base of the vessel such that the card may be released for removal from the slot by urging the tab toward the opening of the slot.

5. The child's feeding utensil of claim 3 including a tray slideably received within said slot, said tray having means for carrying a visual display and at least one detent for coperatively engaging the detent in the base of said vessel.

6. The child's feeding utensil of claim 5 wherein the slot includes a constriction adjacent the other end thereof, said constriction establishing said detent in the base of the vessel, said tray having one end juxtaposed with the opening of the slot and an opposite end including a tab juxtaposed with the other end of the slot, said detent on the tray being adjacent the tab such that the tray may be released for removal from the slot by urging the tap toward the opening of the slot.

References Cited

UNITED STATES PATENTS

| 777,305 | 12/1904 | Priestnall | 40—324 |
| 1,561,730 | 11/1920 | Kodama | 40—324 |
| 2,156,351 | 5/1939 | Paul | 40—324 |
| 2,535,265 | 12/1950 | Caffrey | 40—207 |
| 2,572,735 | 10/1951 | Kugel | 40—159 |

EUGENE R. CAPOZIO, Primary Examiner

W. J. CONTRERAS, Assistant Examiner

U.S. Cl. X.R.

40—16